United States Patent
Kramer

(10) Patent No.: US 9,341,377 B2
(45) Date of Patent: May 17, 2016

(54) SPHERICAL COLLET FOR MOUNTING A GAS TURBINE ENGINE LINER

(71) Applicant: United Technologies Corporation, Hartford, CT (US)

(72) Inventor: George J. Kramer, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 769 days.

(21) Appl. No.: 13/706,404

(22) Filed: Dec. 6, 2012

(65) Prior Publication Data

US 2014/0157782 A1    Jun. 12, 2014

(51) Int. Cl.
*F23R 3/60*     (2006.01)
*F02K 1/82*     (2006.01)

(52) U.S. Cl.
CPC ... *F23R 3/60* (2013.01); *F02K 1/82* (2013.01); *F23R 2900/00005* (2013.01); *F23R 2900/00017* (2013.01); *Y10T 29/4932* (2015.01)

(58) Field of Classification Search
CPC ............. F02K 1/80; F02K 1/82; F23R 3/60; F23R 2900/00005; F23R 2900/29; F23R 2900/000017; F02C 7/20; F05D 2240/90; F05D 2240/91; F16M 11/06; F16M 11/08; F16M 11/12; F16M 11/2078; B23B 31/201; B23B 31/202; B23B 2231/2013; B23B 2231/301; B23B 2231/2027; B23B 2231/2075; F16C 11/06; F16C 11/0604; F16C 11/0609; F16C 11/0614; F16C 11/12
See application file for complete search history.

(56) References Cited

U.S. PATENT DOCUMENTS

| | | | | |
|---|---|---|---|---|
| 2,462,603 A * | 2/1949 | Boots | ...................... | F16B 39/34 238/262 |
| 3,053,283 A * | 9/1962 | Milford | ..................... | F02K 1/82 138/111 |
| 4,565,345 A * | 1/1986 | Templeman | .............. | B60R 1/06 248/481 |
| 5,059,055 A | 10/1991 | DeGress et al. | | |
| 5,088,279 A * | 2/1992 | MacGee | ................... | F02C 7/20 60/226.1 |
| 5,431,534 A * | 7/1995 | Charbonnel | .......... | F01D 21/003 415/118 |
| 6,887,242 B2 * | 5/2005 | Doubler | ............. | A61B 17/7035 606/274 |
| 7,017,334 B2 * | 3/2006 | Mayer | ..................... | F02K 1/822 239/127.3 |

(Continued)

*Primary Examiner* — William H Rodriguez
*Assistant Examiner* — Jason H Duger
(74) *Attorney, Agent, or Firm* — Carlson, Gaskey & Olds, PC

(57) ABSTRACT

A liner and attachment structure has an exhaust liner for use in a gas turbine engine. At least one hanger has feet secured to the liner. The hanger has an aperture extending at a central web. A flanged washer is received within the opening in the hanger. The flanged washer allows adjustment relative to the hanger. The flanged washer has a spherical recess. A collet has a plurality of part-spherical fingers separated by slots, and are received in the spherical recess of the flanged washer. A member extends into the collet to hold the part-spherical fingers radially outwardly. The member is also utilized to secure static structure, and to secure the liner to the static structure.

19 Claims, 3 Drawing Sheets

(56) References Cited

U.S. PATENT DOCUMENTS

| | | | |
|---|---|---|---|
| 7,024,863 B2* | 4/2006 | Morenko | F23R 3/60 60/752 |
| 7,320,555 B2* | 1/2008 | Chang | F16C 11/106 248/288.31 |
| 7,814,753 B2 | 10/2010 | Farah et al. | |
| 7,861,535 B2* | 1/2011 | Figueroa | F02C 7/20 60/766 |
| 7,975,488 B2 | 7/2011 | Farah et al. | |
| 8,418,473 B2* | 4/2013 | Petty | F01D 25/28 403/144 |
| 2009/0079164 A1* | 3/2009 | Columbia | B60D 1/06 280/511 |
| 2011/0023283 A1* | 2/2011 | Blachon | F16C 11/0614 29/428 |
| 2013/0318979 A1* | 12/2013 | Kramer | F02K 1/82 60/752 |
| 2013/0319007 A1* | 12/2013 | Peters | F02K 1/822 60/805 |
| 2014/0047849 A1* | 2/2014 | Kramer | F02K 1/80 60/796 |
| 2014/0048166 A1* | 2/2014 | Kramer | F02K 1/822 138/149 |
| 2014/0090399 A1* | 4/2014 | McAlice | F02K 1/82 60/796 |
| 2014/0109592 A1* | 4/2014 | Senofonte | F02C 7/20 60/796 |

\* cited by examiner

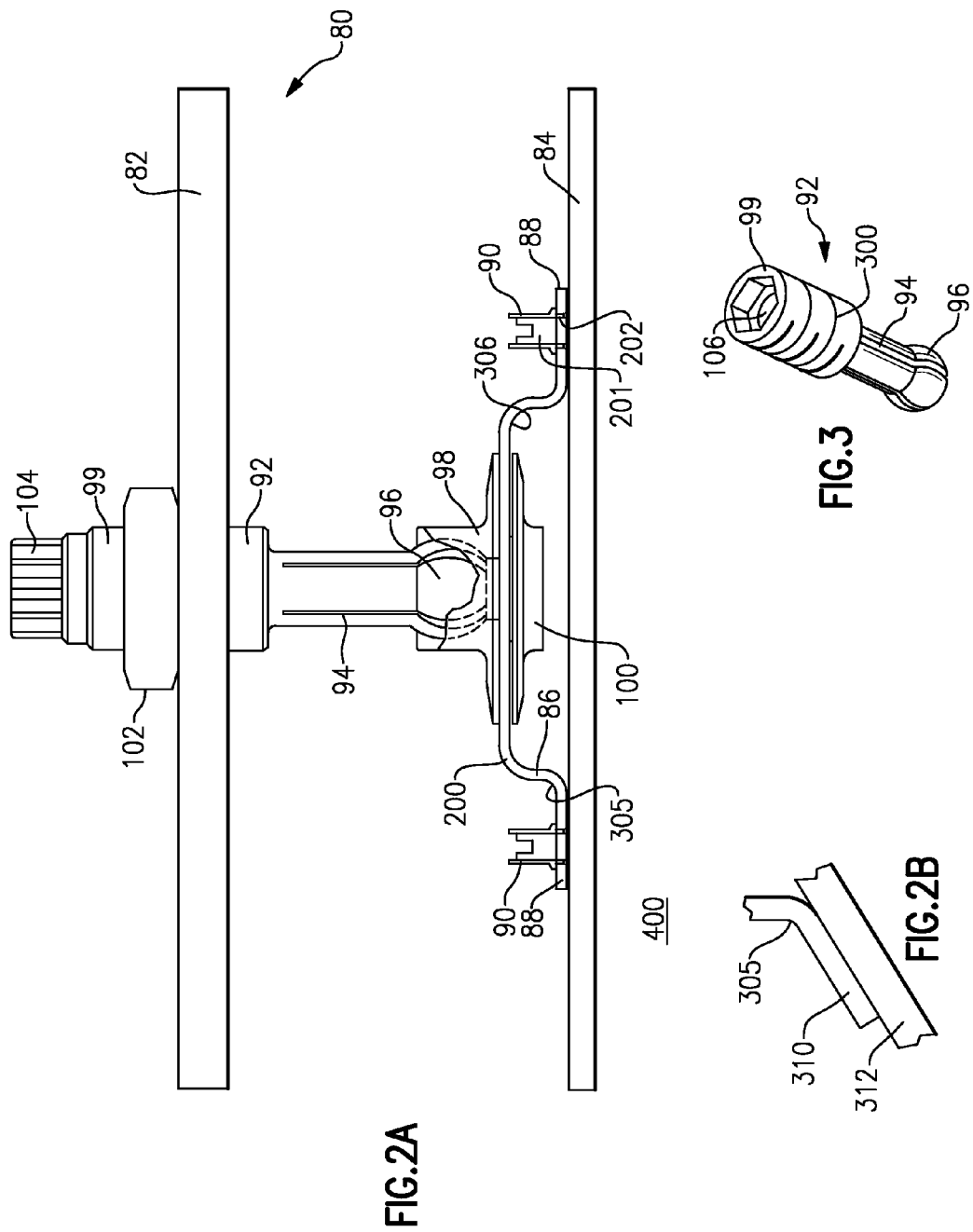

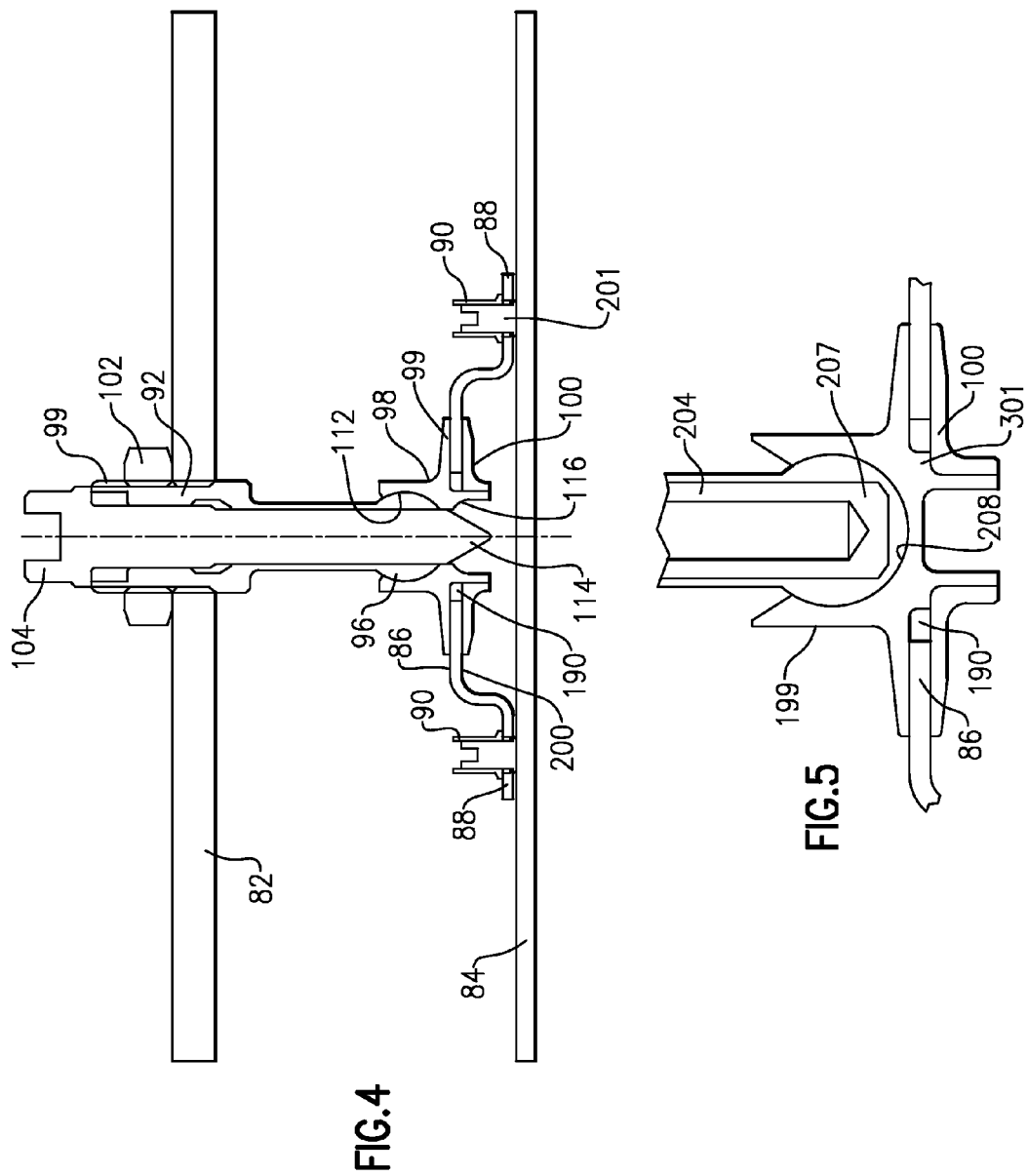

SPHERICAL COLLET FOR MOUNTING A GAS TURBINE ENGINE LINER

BACKGROUND OF THE INVENTION

This application relates to a spherical collet received in a floating washer to mount a gas turbine nozzle liner to static structure.

Gas turbine engines are known, and typically include a compressor compressing air and delivering it into a combustion section where it is mixed with fuel and ignited. Products of this combustion pass downstream over a turbine rotor, driving it to rotate. The turbine rotor in turn drives the compressor rotor.

Downstream of the turbine rotors, the products of combustion exit through an exhaust nozzle. A liner typically faces the hot products of combustion, and must be mounted to static structure. Mounting the liner has raised challenges, in that the connection is subject to a number of stresses.

As an example, the mounting hardware must accommodate large misalignments between the static structure and the liner due to tolerances, complex shape, restricted physical access, significant pressure loads, high temperatures and resultant thermal growth mismatches.

Typically, the mounting hardware which has been utilized has been quite complex, and has not always allowed adequate adjustment.

In one known mounting arrangement, a pivot connection secures the liner to the static structure. As the liner is exposed to heat, it can expand in an axial direction. As the liner moves due to this expansion, the pivot connection causes a link arm connected to the static structure to move through an arc. With this movement, the mount structure may be pulled away from the liner.

In other challenges, the distance between the static structure and the liner to be accommodated by the mount structure must be precisely sized. This raises challenges due to tolerances on the liner or the static structure. Thus, the mounting structure must be specifically rigged for the particular liner and static structure, which of course raises the labor and machining costs.

In other arrangements, shims are necessary to accommodate the specific sizes.

SUMMARY OF THE INVENTION

In a featured embodiment, a liner and attachment structure has an exhaust liner for use in a gas turbine engine. There is at least one hanger having feet secured to the liner. The hanger has an aperture at a central web. A flanged washer is received within the aperture in the hanger, and is allowed adjustment relative to the hanger. The flanged washer has a spherical recess. A collet has a plurality of part-spherical fingers separated by slots. The part-spherical fingers are received in the spherical recess of the flanged washer. A member extends into the collet to hold the part-spherical fingers radially outwardly. The member is also utilized to be secured to static structure, to secure the liner to the static structure.

In another embodiment according to the previous embodiment, the member is one of a bolt or pin.

In another embodiment according to any of the previous embodiments, the member is mounted to the static structure and is secured with a lock nut.

In another embodiment according to any of the previous embodiments, an end of said flanged washer which faces said liner has an opening, and the member extending through the opening.

In another embodiment according to any of the previous embodiments, the flanged washer has an enclosed bore at an end facing the liner, such that the member does not extend through the bore.

In another embodiment according to any of the previous embodiments, a second washer is positioned on an opposed side of the hanger from the flanged washer.

In another embodiment according to any of the previous embodiments, the collet has threads on an outer periphery which can be adjusted relative to a static structure which is to be connected to the liner.

In another embodiment according to any of the previous embodiments, the aperture is received about a surface on the flanged washer with a clearance. The clearance allows the adjustability of the flanged washer relative to the hanger.

In another embodiment according to any of the previous embodiments, the feet may be bent relative to the central web to allow the hanger to be attached to a liner at a surface which is non-parallel to the central web.

In another featured embodiment, a gas turbine engine has a static structure and an exhaust liner for facing an exhaust duct. The exhaust liner is secured to the static structure by a system including at least one hanger. The hanger has feet secured to the liner. The hanger has an aperture extending at a central web. A flanged washer is received within the opening in the hanger. The flanged washer allows axial adjustment relative to the hanger. The flanged washer has a spherical recess. A collet has a plurality of part-spherical fingers separated by slots, with the part-spherical fingers received in the spherical recess of the flanged washer. A member extends into the collet to hold the part-spherical fingers radially outwardly. The member also is utilized to be secured to static structure, and to secure the liner to the static structure.

In another embodiment according to any of the previous embodiments, the member is one of a bolt or pin.

In another embodiment according to any of the previous embodiments, if the member is mounted to the static structure, it is secured with a lock nut.

In another embodiment according to any of the previous embodiments, an end of the flanged washer which faces the liner has an opening, and the member extends through the opening.

In another embodiment according to any of the previous embodiments, the flanged washer has an enclosed bore at an end facing the liner, such that the member does not extend through the bore.

In another embodiment according to any of the previous embodiments, a second washer is positioned on an opposed side of the hanger from the flanged washer.

In another embodiment according to any of the previous embodiments, the collet has threads on an outer periphery which can be adjusted relative to the static structure and liner.

In another embodiment according to any of the previous embodiments, the aperture is received about a surface on the flanged washer with a clearance. The clearance allows the adjustability of the flanged washer relative to the hanger.

In another embodiment according to any of the previous embodiments, at least one of the feet is bent relative to the central web to allow the hanger to be attached to the liner at a surface which is non-parallel to the central web.

In another featured embodiment, a method of attaching a liner to static structure includes the steps of attaching a hanger to a liner, and attaching mount structure to the hanger and to a static structure in a gas turbine engine, and adjusting the length of the mount structure by threadably adjusting the position of a portion of the mount structure to accommodate a distance between the liner and static structure.

In another embodiment according to the previous embodiment, the mount structure includes a collet which is threadably adjustable within a nut associated with the static structure. The collet extends into a flanged washer which receives the hanger.

These and other features may be best understood from the following specification and drawings, the following which is a brief description.

BRIEF DESCRIPTION OF THE DRAWINGS

FIG. 2A shows the mounting of a liner.
FIG. 2B shows an alternative detail.
FIG. 3 shows a collet as incorporated into the FIG. 2A structure.
FIG. 4 is a cross-sectional view through FIG. 2A.
FIG. 5 shows an alternative embodiment.

DETAILED DESCRIPTION

Figure 1:
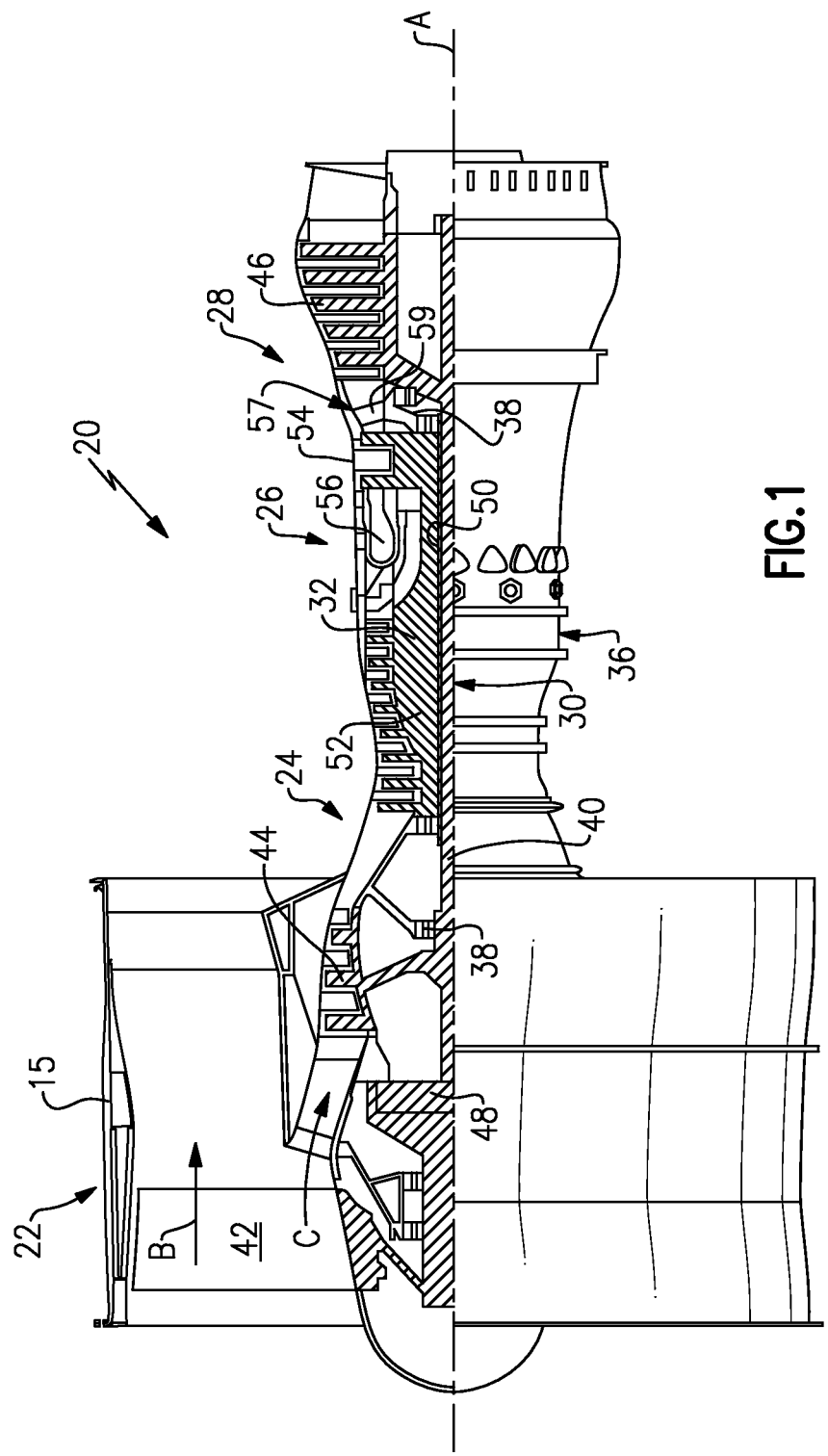
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

A mounting structure 80 for mounting an exhaust liner 84 to a static structure 82 is shown in FIG. 2A. The liner faces hot products of combustion in a radially inner chamber 400. As mentioned above, it has been challenging to mount such liners 84 to static structures 82.

The inventive mounting features include a hanger 86 having two or more legs 88 which are attached with studs and collars 90 to the liner 84. An opening in a central web 200 receives a washer 98, as described below.

A pair of floating washers 98 and 100 allow axial and side-to-side misalignment between the hanger and the static structure 82 as will be explained below.

The flanged washer 98 includes a spherical cavity, as will be explained below, receiving a plurality of part-spherical fingers 96 on collet 92. Slots 94 separate the fingers 96. An upper end 99 of the collet 92 receives a self-locking nut 102, and a bolt or pin 104 is driven into the collet 92 to ensure that the part-spherical fingers 96 are moved and/or remain outwardly in the recess within the flanged washer 98.

The spherical connection allows angular misalignment and adjustment between the static structure 82 and the liner 84, and the flanged washers 98/100 allow axial alignment.

As shown in FIGS. 2A and 2B, a corner 305 connects the leg 88 to liner 84. As shown in FIG. 2A, the liner 84 is generally parallel to the central web 200. However, as shown in FIG. 2B, by bending the leg as shown at 310, and at the corner 305, the hanger 86 can be mounted to a liner 312 that has a more complex surface which is not parallel to the central web 200.

Further, a bend at 306 can be adjusted to provide for a varying spring rate between the hanger 86 and the liner 84. A collar 90 is shown to be received on a stud 201. An opening 202 in the leg 88 is shown to be larger than the stud 201, and this also allows some adjustment. This type of mount arrangement has been utilized in the prior art, but provides synergistic benefits in combination with the other adjustability as disclosed in this application.

FIG. 3 is a detail of the collet 92 and shows the slots 94 separating the part-spherical fingers 96. Threads 300 are formed on an outer surface.

FIG. 4 is a cross-sectional view and shows details of the collet 92, and the spherical recess 112 within the flanged washer 98. As can be seen, there is clearance 190 between radially inner ends of the hanger 86, and an outer surface of the washer 98. This allows adjustment between the washer 98 and the hanger 86, and hence adjustment between the washer 98 and the liner 84.

As shown in FIG. 4, the collet 92 is threaded into the nut 102. Thus, it can be tightened or loosened relative to the nut 102 to accommodate the tolerances or other variations between the location of the central web 200, the washer 98, and the static structure 82. Thus, the problems mentioned above with regard to the necessity of rigging or shimming to accommodate the distances between the liner 84 and the static structure 82 are overcome by the adjustability of the collet 92.

In addition, due to the clearance 190, the liner 84 can adjust in its plane, and simply move within the clearance 190. Thus, the problem mentioned above with regard to arcuate movement, and the mount structure being pulled away from the liner are overcome.

The washer 100 is threaded onto the washer 98, capturing the central web 200. Afterward, the threaded connection may be deformed in some manner such that the two washers 98 and 100 will not become loose.

As shown in FIG. 4, the bolt 104 has been driven inwardly such that the part-spherical fingers 96 are held outwardly within the recess 112, and there is ability for relative adjustment between static structure 82 and the liner 84 via 92, as mentioned above.

As shown in the FIG. 4 embodiment, a bottom end 116 of the washer 98 is open, and a bottom end 114 of the pin 104 extends through that opening.

FIG. 5 shows an alternative embodiment wherein the washer 199 has a bottom bore 208, and the bolt or the pin 204 has a bottom end 207 which is received within the bore 200. There is clearance 190, as in the prior embodiment. A stop 301 on washer 199 abuts a surface on washer 100.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A liner and attachment structure comprising:
   an exhaust liner exposed to exhaust gases within a gas turbine engine;
   at least one hanger, said at least one hanger having feet which are secured to said exhaust liner, and said at least one hanger having an aperture at a central web of said at least one hanger;
   a flanged washer received within said aperture in said at least one hanger, and said flanged washer is adjustable relative to said at least one hanger, said flanged washer having a spherical recess;
   a collet having a plurality of part-spherical fingers separated by slots, with said plurality of part-spherical fingers received in said spherical recess of said flanged washer, and a member extending into said collet to hold said plurality of part-spherical fingers radially outwardly, and said member also being secured to a static structure, to secure said exhaust liner to the static structure,
   wherein an outer periphery of said collet has threads that are adjustable relative to the static structure and said exhaust liner.

2. The structure as set forth in claim 1, wherein said member is one of a bolt or pin.

3. The structure as set forth in claim 1, wherein said member is mounted to the static structure and secured with a lock nut.

4. The structure as set forth in claim 1, wherein an end of said flanged washer which faces said exhaust liner has an opening, and the member extending through the opening.

5. The structure as set forth in claim 1, wherein said flanged washer has an enclosed bore at an end facing said exhaust liner, such that said member does not extend through said bore.

6. The structure as set forth in claim 1, wherein a second washer is positioned on an opposed side of said at least one hanger from said flanged washer.

7. A method of attaching the structure set forth in claim 1, a step of attaching said exhaust liner to the static structure comprising the steps of:
   attaching said at least one hanger to said exhaust liner, and attaching said flanged washer to said at least one hanger, and attaching said at least one hanger to the static structure, and adjusting a distance between said exhaust liner and said static structure by threadably adjusting the threads on the outer periphery of said collet.

8. The method of claim 7, wherein said collet is threadably adjustable within a nut associated with said static structure, and the collet extending into said flanged washer.

9. The structure as set forth in claim 1, wherein said aperture is positioned about a surface on said flanged washer with a clearance, and said clearance allowing the adjustability of said flanged washer relative to said at least one hanger.

10. The structure as set forth in claim 1, wherein said feet may be bent relative to said central web to allow said at least one hanger to be attached to said exhaust liner at a surface which is non-parallel to said central web.

11. A gas turbine engine comprising:
   a static structure, and an exhaust liner facing an exhaust duct, the exhaust liner being secured to the static structure by a system including at least one hanger, said at least one hanger having feet which are secured to said exhaust liner, and said at least one hanger having an aperture at a central web, a flanged washer received within said aperture in said at least one hanger, and said flanged washer allowing axial adjustment of said exhaust liner relative to said at least one hanger, said flanged washer having a spherical recess, a collet having a plurality of part-spherical fingers separated by slots, with said part-spherical fingers received in said spherical recess of said flanged washer, and a member extending into said collet to hold said part-spherical fingers radially outwardly, and said member also being secured to the static structure to secure said exhaust liner to the static structure.

12. The gas turbine engine as set forth in claim 11, wherein said member is one of a bolt or pin.

13. The gas turbine engine as set forth in claim 11, wherein said member is mounted to the static structure and secured with a lock nut.

14. The gas turbine engine as set forth in claim 11, wherein an end of said flanged washer which faces said exhaust liner has an opening, and the member extending through the opening.

15. The gas turbine engine as set forth in claim 11, wherein said flanged washer has an enclosed bore at an end facing said exhaust liner, such that said member does not extend through said bore.

16. The gas turbine engine as set forth in claim 11, wherein a second washer is positioned on an opposed side of said at least one hanger from said flanged washer.

17. The gas turbine engine as set forth in claim 11, wherein said collet has threads on an outer periphery to allow adjustment relative to said static structure and said exhaust liner.

18. The gas turbine engine as set forth in claim 11, wherein said aperture is positioned about a surface on said flanged washer with a clearance, and said clearance allowing adjustability of said flanged washer relative to said at least one hanger.

19. The gas turbine engine as set forth in claim 11, wherein at least one of said feet is bent relative to said central web to allow said at least one hanger to be attached to said exhaust liner at a surface which is non-parallel to said central web.

\* \* \* \* \*